US009949243B2

(12) United States Patent
Gupta et al.

(10) Patent No.: US 9,949,243 B2
(45) Date of Patent: Apr. 17, 2018

(54) USER EQUIPMENT AND METHOD FOR APPLICATION AGNOSTIC DISCONTINUOUS RECEPTION (DRX) TRIGGERING

(75) Inventors: Maruti Gupta, Portland, OR (US); Ali Taha Koc, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 282 days.

(21) Appl. No.: 13/993,023

(22) PCT Filed: Jun. 27, 2012

(86) PCT No.: PCT/US2012/044390
§ 371 (c)(1),
(2), (4) Date: Aug. 26, 2013

(87) PCT Pub. No.: WO2013/006339
PCT Pub. Date: Jan. 10, 2013

(65) Prior Publication Data
US 2014/0105087 A1    Apr. 17, 2014

Related U.S. Application Data

(60) Provisional application No. 61/504,054, filed on Jul. 1, 2011.

(51) Int. Cl.
*H04W 72/04* (2009.01)
*H04W 72/12* (2009.01)
(Continued)

(52) U.S. Cl.
CPC ........ *H04W 72/042* (2013.01); *H04B 7/0697* (2013.01); *H04B 15/00* (2013.01);
(Continued)

(58) Field of Classification Search
CPC .................... H04W 52/0209; H04W 2/02125
See application file for complete search history.

(56) References Cited

U.S. PATENT DOCUMENTS

2010/0272075 A1* 10/2010 Ramos .............. H04W 72/1252
                                                      370/336
2011/0026625 A1*  2/2011 Susitaival ......... H04W 52/0251
                                                      375/260
(Continued)

FOREIGN PATENT DOCUMENTS

CN        1176030 A      3/1998
CN      101360340 A  *  2/2009  .......... H04W 76/048
(Continued)

OTHER PUBLICATIONS

"International Application Serial No. PCT/US2012/044390, International Preliminary Report on Patentability mailed Jan. 16, 2014", 6 pgs.
(Continued)

*Primary Examiner* — Sulaiman Nooristany
(74) *Attorney, Agent, or Firm* — Schwegman Lundberg & Woessner, P.A

(57) ABSTRACT

Embodiments of user equipment (UE) and methods for application-agnostic discontinuous reception (DRX) triggering are generally described herein. In some embodiments, a UE is configured to monitor buffer status history and traffic activity history, and trigger DRX mode activation based on the buffer status and the traffic activity history. In some embodiments, the UE may determine a probability, based on the buffer status history and the traffic activity history, that a level of traffic activity that cannot be handled during DRX mode would occur. In these embodiments, the UE may trigger DRX mode activation when the probability is below a threshold.

20 Claims, 2 Drawing Sheets

(51) Int. Cl.
- *H04W 72/08* (2009.01)
- *H04W 88/06* (2009.01)
- *H04B 7/06* (2006.01)
- *H04L 1/00* (2006.01)
- *H04L 1/06* (2006.01)
- *H04B 15/00* (2006.01)
- *H04W 8/02* (2009.01)
- *H04W 24/00* (2009.01)
- *H04W 52/24* (2009.01)
- *H04W 52/02* (2009.01)
- *H04L 5/00* (2006.01)
- *H04L 27/34* (2006.01)
- *H04L 5/14* (2006.01)
- *H04W 4/00* (2018.01)
- *H04W 72/02* (2009.01)
- *H04W 76/02* (2009.01)
- *H04W 52/14* (2009.01)
- *H04W 24/08* (2009.01)
- *H04W 76/04* (2009.01)
- *H04L 27/36* (2006.01)
- *H04W 52/32* (2009.01)
- *H04W 84/04* (2009.01)

(52) U.S. Cl.
CPC .......... *H04L 1/0038* (2013.01); *H04L 1/0041* (2013.01); *H04L 1/0045* (2013.01); *H04L 1/06* (2013.01); *H04L 5/0037* (2013.01); *H04L 5/14* (2013.01); *H04L 27/34* (2013.01); *H04W 4/005* (2013.01); *H04W 8/02* (2013.01); *H04W 24/00* (2013.01); *H04W 24/08* (2013.01); *H04W 52/0209* (2013.01); *H04W 52/0212* (2013.01); *H04W 52/0251* (2013.01); *H04W 52/0258* (2013.01); *H04W 52/143* (2013.01); *H04W 52/242* (2013.01); *H04W 52/244* (2013.01); *H04W 72/02* (2013.01); *H04W 72/04* (2013.01); *H04W 72/0446* (2013.01); *H04W 72/082* (2013.01); *H04W 72/1215* (2013.01); *H04W 72/1278* (2013.01); *H04W 76/028* (2013.01); *H04W 76/048* (2013.01); *H04W 88/06* (2013.01); *H04L 1/0025* (2013.01); *H04L 27/362* (2013.01); *H04W 52/325* (2013.01); *H04W 84/042* (2013.01); *Y02B 60/50* (2013.01)

(56) References Cited

U.S. PATENT DOCUMENTS

| | | | | |
|---|---|---|---|---|
| 2012/0076011 | A1* | 3/2012 | Gobriel | H04W 52/0258 370/252 |
| 2012/0120843 | A1* | 5/2012 | Anderson | H04W 76/048 370/253 |

FOREIGN PATENT DOCUMENTS

| | | | | |
|---|---|---|---|---|
| CN | 101360340 A | | 2/2009 | |
| CN | 101617553 A | * | 12/2009 | ............ H04W 24/10 |
| CN | 101617553 A | | 12/2009 | |
| EP | 2320692 A1 | | 5/2011 | |
| WO | WO-2009136830 A1 | | 11/2009 | |
| WO | WO-2013006339 A2 | | 1/2013 | |
| WO | WO-2013006339 A3 | | 1/2013 | |

OTHER PUBLICATIONS

"International Application Serial No. PCT/US2012/044390, International Search Report mailed Jan. 17, 2013", 3 pgs.

"International Application Serial No. PCT/US2012/044390, Written Opinion mailed Jan. 17, 2013", 4 pgs.

"Chinese Application Serial No. 201280042262.3, Office Action dated Nov. 3, 2016", 6 pgs.

"Chinese Application Serial No. 201280042262.3, Office Action dated Jun. 15, 2017", w/o English Translation, 5 pgs.

"Chinese Application Serial No. 201280042262.3, Response filed Aug. 23, 2017 to Office Action dated Jun. 15, 2017", w/ English Claims, 11 pgs.

"Chinese Application Serial No. 201280042262.3, Office Action dated Nov. 28, 2017", w/ English Translation, 13 pgs.

* cited by examiner

USER EQUIPMENT AND METHOD FOR APPLICATION AGNOSTIC DISCONTINUOUS RECEPTION (DRX) TRIGGERING

PRIORITY CLAIM

This application is a U.S. National Stage Filing under 35 U.S.C. 371 from International Application No. PCT/US2012/044390, filed Jun. 27, 2012 and published in English as WO 2013/006339 on Jan. 10, 2013, which claims priority under 35 U.S.C. 119(e) to U.S. Provisional Patent Application Ser. No. 61/504,054, filed Jul. 1, 2011, all of which are hereby incorporated by reference in their entireties.

TECHNICAL FIELD

Embodiments pertain to wireless communications. Some embodiments relate to discontinuous reception (DRX) in wireless networks including those networks that operate in accordance a 3GPP Evolved Universal Terrestrial Radio Access Network (E-UTRAN) Long-Term-Evolution (LTE-A) advanced network standard.

BACKGROUND

One issue with mobile and portable wireless communication devices, such as user equipment (UE), is power savings since most of these devices utilize a battery that has a limited energy storage capacity. Some mobile devices may enter an idle mode to save energy and may enter an active mode for communications to take place. During idle mode or active mode, a mobile device may enter a discontinuous reception (DRX) mode in order to reduce power consumption. During idle mode DRX, the mobile station may listen to a control channel only during certain intervals to reduce power consumption.

Conventionally, DRX mode activation is triggered by when an inactivity timer expires. This conventional technique for DRX mode triggering does not take into account traffic activity or device status resulting in less-than optimum power savings.

Thus, there are general needs for UE and methods for DRX mode triggering that can achieve improved power savings over conventional techniques.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
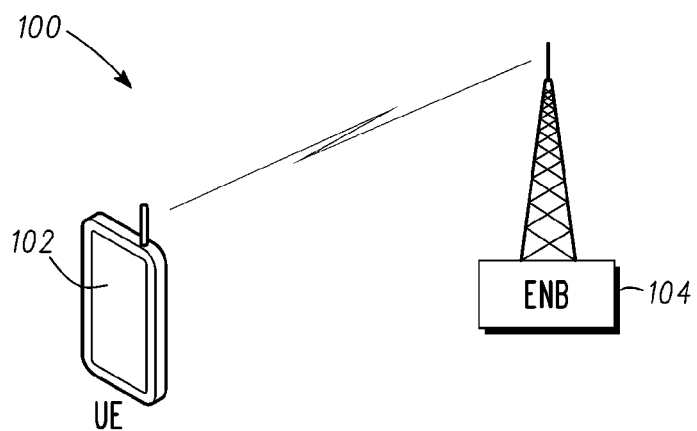
FIG. 1 illustrates a wireless network in accordance with some embodiments.

FIG. 1 illustrates a wireless network in accordance with some embodiments. Wireless network 100 may include one or more base stations, such as evolved or enhanced Node-B (eNB) 104, that are configured to communicate with one or more mobile stations, such as user equipment (UE) 102. The eNB 104 may operate as a serving eNB for UE 102. In some broadband multicarrier embodiments, wireless network may be a LTE network, and the eNB 104 and the UE 102 may operate in accordance with an Evolved Universal Terrestrial Radio Access Network (E-UTRAN) 3GPP Long-Term-Evolution (LTE) standard, although the scope of the embodiments is not limited in this respect. In these broadband multicarrier network embodiments, the eNB 104 and the UE 102 may be configured to communicate in accordance with an orthogonal frequency division multiple access (OFDMA) technique. In some other broadband multicarrier embodiments, the eNB 104 may be an advanced base station (ABS) and the UE 102 may be an advanced mobile station (AMS) and may operate in accordance with a Worldwide Interoperability for Microwave Access (WiMAX) IEEE 802.16 communication standard.

In accordance with embodiments, the UE 102 may be configured for application-agnostic DRX mode triggering. In these embodiments, the UE 102 may monitor buffer status history and traffic activity history, and may trigger DRX mode activation based on the buffer status and the traffic activity history. In these embodiments, the triggering of DRX mode is application-agnostic and does not utilize the requirements of any applications running on the UE to trigger DRX mode.

In these embodiments, triggering DRX mode activation may be UE-assisted based on buffer status history and traffic activity history. This is unlike DRX mode activation in some conventional LTE networks in which DRX mode is triggered solely based on the expiration of a DRX inactivity timer that is statically assigned. In accordance with embodiments, by triggering DRX mode based on buffer status history and traffic activity history, additional power savings may be achieved without impacting application performance. For example, the UE-assisted DRX mode triggering in some embodiments may reduce power consumption since the UE 102 does not need to remain in a higher-power mode while waiting for the DRX inactivity timer to expire. These embodiments are described in more detail below.

In some embodiments, the UE may determine a probability, based on the buffer status history and the traffic activity history, that a level of traffic activity that cannot be handled during DRX mode would occur. In these embodiments, the UE may trigger DRX mode activation when the probability is below a threshold.

In some embodiments, to monitor traffic activity, the UE 102 may monitor a number of packet arrivals (i.e., received packets) and monitor a number of packet departures (i.e., packet transmissions) within a time window. To monitor the buffer status history, the UE 102 may monitor an uplink buffer empty rate at which an uplink buffer of UE device memory is flushed for uplink traffic over the time window.

In some embodiments, to monitor traffic activity history, the UE 102 may monitor the number of packet arrivals on a Physical Downlink Control Channel (e.g., the PDCCH) and monitor a number of packet departures on a Physical Uplink Control Channel (e.g., the PUCCH).

In some embodiments, the time window may be indicated by the number of consecutive PDCCH frames, although the scope of the embodiments is not limited in this respect. In some embodiments, traffic activity statistics such as packet size as well as the number of packets received or transmitted over a certain window may be used to determine whether or not DRX mode should be triggered.

In some embodiments, the uplink buffer empty rate may indicate a rate at which packets are being generated by the UE 102 with respect to network delay. The UE 102 may refrain from triggering DRX mode activation when the uplink buffer empty rate indicates a rate at which packets being generated that is greater than a rate at which packets can be transmitted in DRX mode.

In some embodiments, the UE 102 may trigger DRX mode activation when the uplink buffer empty rate indicates a rate at which packets being generated that is no greater than the rate at which packets can be transmitted in DRX mode and when the traffic activity history indicates that the probability that a level of traffic activity that cannot be handled during DRX mode is below a predetermined threshold.

As discussed above, the UE 102 may analyze two factors to determine when to trigger DRX mode activation. One factor, traffic activity history, includes the count of packets arriving or departing and indicates how much packet activity has taken place in a prior predetermined period amount of time. The traffic activity history provides an indication of whether the UE 102 is running an application that generates data less or more frequently. The other factor, the buffer status history, may indicate a rate at which the uplink buffer is being emptied. This uplink buffer empty rate may be used by the UE 102 to determine what will happen if the UE's transceiver remains off for a certain length of time during DRX mode. The uplink buffer empty rate may provide an indication of the amount of application traffic being generated. For example, transmitting only one packet every twenty PDCCH sub-frames may indicate low traffic and is a rate that may be handled during the on-duration of DRX cycle. However, transmitting at least one packet every one to two PDCCH frames may indicate that the UE 102 is generating lots of packets indicating that the UE 102 should not be in DRX mode and thus should not trigger DRX mode activation.

The uplink buffer empty rate may also indicate network delay. In some embodiments, when the uplink buffer empty rate is higher than the rate at which the UE 102 generates packets, the network may be able to handle packets with a lower delay and thus can sustain DRX mode. In these situations, the UE 102 may trigger DRX mode activation. On the other hand, when the uplink buffer empty rate is lower than the rate at which the UE 102 generates packets, the network may be busy and is taking a longer to transmit a packet. Entering DRX mode may cause additional delay. In this situation, the UE 102 may refrain from trigger DRX mode activation.

In some embodiments, the UE 102 may determine an on-duration of the DRX cycle based on the uplink buffer empty rate. The UE 102 may provide an indication of the determined or recommended on-duration to the serving eNB 104 when triggering DRX mode activation. In these embodiments, a shorter or longer duration (than predetermined durations) for the on-duration of the DRX cycle may be selected by the UE 102 to handle the rate at which packets are being generated for uplink transmission. In some embodiments, a shorter or longer DRX cycle length may also be selected and indicated to the serving eNB 104, although the scope of the embodiments is not limited in this respect.

In some embodiments, the UE 102 may determine a probability, based on the buffer status history and/or the traffic activity history, that a level of traffic activity that cannot be handled during DRX mode would occur. The UE 102 may then trigger the DRX mode activation when the probability is below a threshold. In these embodiments, the level of traffic activity that can be handled during DRX mode may depend on whether the UE 102 is configured to transmit and receive data during DRX mode. In some embodiments, the UE 102 may be prohibited from transmitting and receiving during DRX mode, while in other embodiments, the UE 102 may be permitted to transmit and receive during DRX mode.

In some embodiments, the UE 102 monitors packet departures and arrivals as well as the uplink buffer empty rate to generate a pattern for use in making a decision regarding whether or not to trigger DRX mode entry. The UE 102 may determine whether by entering DRX mode, the UE 102 would be capable of handling a predicted change in traffic activity. For example, a sudden increase in traffic activity may overwhelm queues of the UE 102 during the off duration of the DRX cycle. In these embodiments, by analyzing the buffer status and traffic activity history, the UE 102 may determine a probability of the occurrence of such an event and base DRX mode triggering accordingly.

In some embodiments, the UE 102 may refrain from triggering the DRX mode activation when the probability is at or above a probability threshold. In these embodiments, the threshold may be based on a fraction of the total uplink buffer size, such as about twenty percent of the total buffer capacity. In these embodiments, the UE 102 may refrain from triggering the DRX mode activation when there is a high probability that the UE buffer will be above about twenty percent of the total buffer capacity.

In some embodiments, during DRX mode, the UE 102 may be configured to refrain from transmitting and receiving data, although the scope of the embodiments is not limited in this respect. In some alternate embodiments, during DRX mode, the UE 102 may be configured to transmit and receive data during an on-duration time of the DRX cycle and refrain from transmitting and receiving data during a remainder of each DRX cycle (i.e., during the off-duration time).

In some embodiments, DRX mode includes at least an on-duration time and a DRX cycle length. The on-duration time may be a period of time of the DRX cycle length during which the UE 102 is configured to monitor orthogonal frequency division multiple access (OFDMA) frames of a physical downlink control channel (PDCCH). The DRX cycle length indicates a periodic repetition rate for a DRX cycle that includes the on-duration time followed by an opportunity for DRX time during which the UE 102 is in a lower-power state (i.e., an off-duration). During the on-duration time while in DRX mode, the UE 102 generally does not transmit or receive data, however this is not a requirement as in some embodiments, the UE 102 may transmit and/or receive data during the on-duration time. In accordance with embodiments, the UE 102 may operate in DRX mode when connected to the network as well as when it is in an idle mode.

In some embodiments, to trigger DRX mode activation, the UE 102 may send a DRX trigger request message to it's a serving eNB (i.e., eNB 104). The UE 102 may wait to receive a DRX mode confirmation message from the eNB before entering DRX mode, however, this is not a requirement.

In some application-agnostic embodiments, the UE 102 may use only high-level traffic statistics comprising buffer status history and traffic activity history to trigger DRX mode activation and refrain from triggering DRX mode based on requirements of applications running on the UE 102 and based on deep packet inspection.

In some embodiments, an application-agnostic DRX triggering method is provided. In these embodiments, the method may include monitoring UE buffer status history and traffic activity history. The method may also include determining a probability, based on the buffer status history and the traffic activity history that a level of traffic activity that cannot be handled during DRX mode would occur. The method may also include triggering the activation of DRX mode when the probability is below a threshold.

Figure 2:
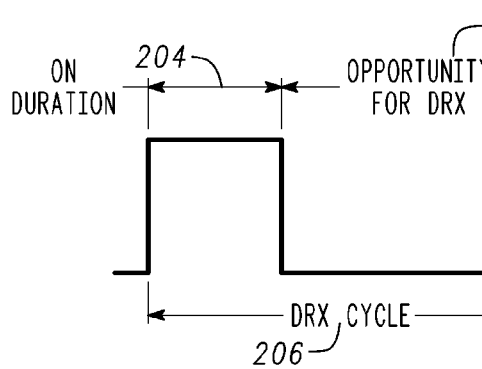
FIG. 2 illustrates a DRX cycle in accordance with some embodiments.

FIG. 2 illustrates a DRX cycle in accordance with some embodiments. Each DRX cycle 206 may include an on-duration time 204 followed by an opportunity for DRX time 205. During the on-duration time 204, the UE 102 (FIG. 1) may monitor frames of a control channel (e.g., for uplink and downlink scheduling information, among other things). During the opportunity for DRX time 205, the UE 102 does not monitor the control channel. In some LTE and LTE-Advanced (LTE-A) embodiments, during the on-duration time 204, the UE 102 may monitor OFDMA frames of a physical downlink control channel (PDCCH). During the opportunity for DRX time 205, the UE 102 does not monitor the PDCCH. During the on-duration time 204, there may or may not be packet activity for the UE 102.

Figure 3:
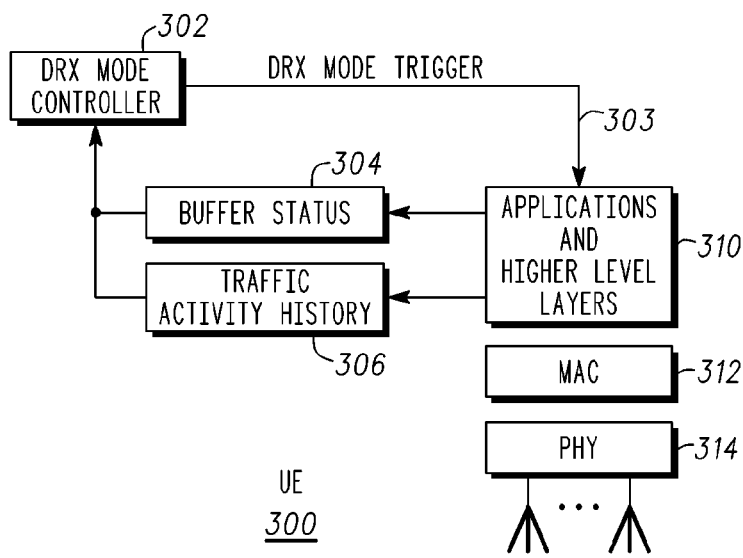
FIG. 3 is a functional block diagram of a UE in accordance with some embodiments.

FIG. 3 is a functional block diagram of a UE in accordance with some embodiments. UE 300 may be suitable for use as UE 102 (FIG. 1) although other configurations may also be suitable. UE 300 may include a DRX mode controller 302 to monitor buffer status history 304 and traffic activity history 306. The DRX controller 302 may trigger DRX mode activation by generating DRX mode activation signal 303 based on the buffer status 304 and the traffic activity history 306 as described above.

The UE 300 may also include a media-access control (MAC) layer 312 for performing MAC layer operations, and a physical (PHY) layer 314 for transmitting and receiving RF signals through one or more antennas. The UE 300 may include an application layer for running one or more applications as part of applications and higher-level layers 310. In some embodiments, the traffic activity history 306 may comprise one or more values indicative of packet arrivals and departures buffer status indicated by applications and higher-level layers 310, PHY layer 314 or MAC layer 312. In some embodiments, the buffer status history 304 may comprise one or more values indicative of the uplink buffer empty rate indicated by applications and higher-level layers 310, PHY layer 314 or MAC layer 312.

In some embodiments, the DRX mode controller 302 may comprise monitoring circuitry to monitor buffer status history and traffic activity history of the UE. The DRX mode controller 302 may also include triggering circuitry to generate a DRX mode trigger signal to trigger DRX mode activation based on the buffer status and the traffic activity history. The monitoring circuitry may interface with one or more layers of the UE to monitor the buffer status history and the traffic activity history. To trigger DRX mode activation, the triggering circuitry may send a DRX trigger request message to a serving eNB. The UE may be configured to wait to receive a DRX mode confirmation message from the eNB before entering DRX mode. To monitor traffic activity history, the monitoring circuitry may monitor a number of packet arrivals and monitor a number of packet departures within a time window. To monitor the buffer status history, the monitoring circuitry may monitor an uplink buffer empty rate at which an uplink buffer of UE device memory is flushed for uplink traffic over the time window. In some of these embodiments, the monitoring circuitry and the triggering circuitry may be implemented with one or more processors as part of the DRX mode controller 302.

In some embodiments, the UE 300 may be a mobile communication device that includes two or more antennas for multiple-input multiple-output (MIMO) communications and is configured to receive OFDMA frames that include the PDCCH for receiving uplink and downlink scheduling information and control information and a physical downlink shared channel (PDSCH) for receiving data that are configured in accordance with an 3GPP LTE standard. In some embodiments, the UE 300 may be a smart phone and may be configured in accordance with a 3GPP LTE Advanced (LTE-A) standard such as 3GPP release 10, release 11 or later releases. In some embodiments, the PDSCH may be configured for high-speed downlink packet access (HSDPA).

In some embodiments, UE 300 may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly. The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some MIMO embodiments, the antennas may be effectively separated to take advantage of spatial diversity and the different channel characteristics that may result between each of the antennas.

In some embodiments, the UE 300 may include one or more of a keyboard, a display, a non-volatile memory port, multiple antennas, a graphics processor, an application processor, speakers, and other mobile device elements. The display may be an LCD screen including a touch screen.

Although UE 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of UE may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the UE 300 may include one or more processors and may be configured with instructions stored on a computer-readable storage device for performing operations described herein.

Figure 4:
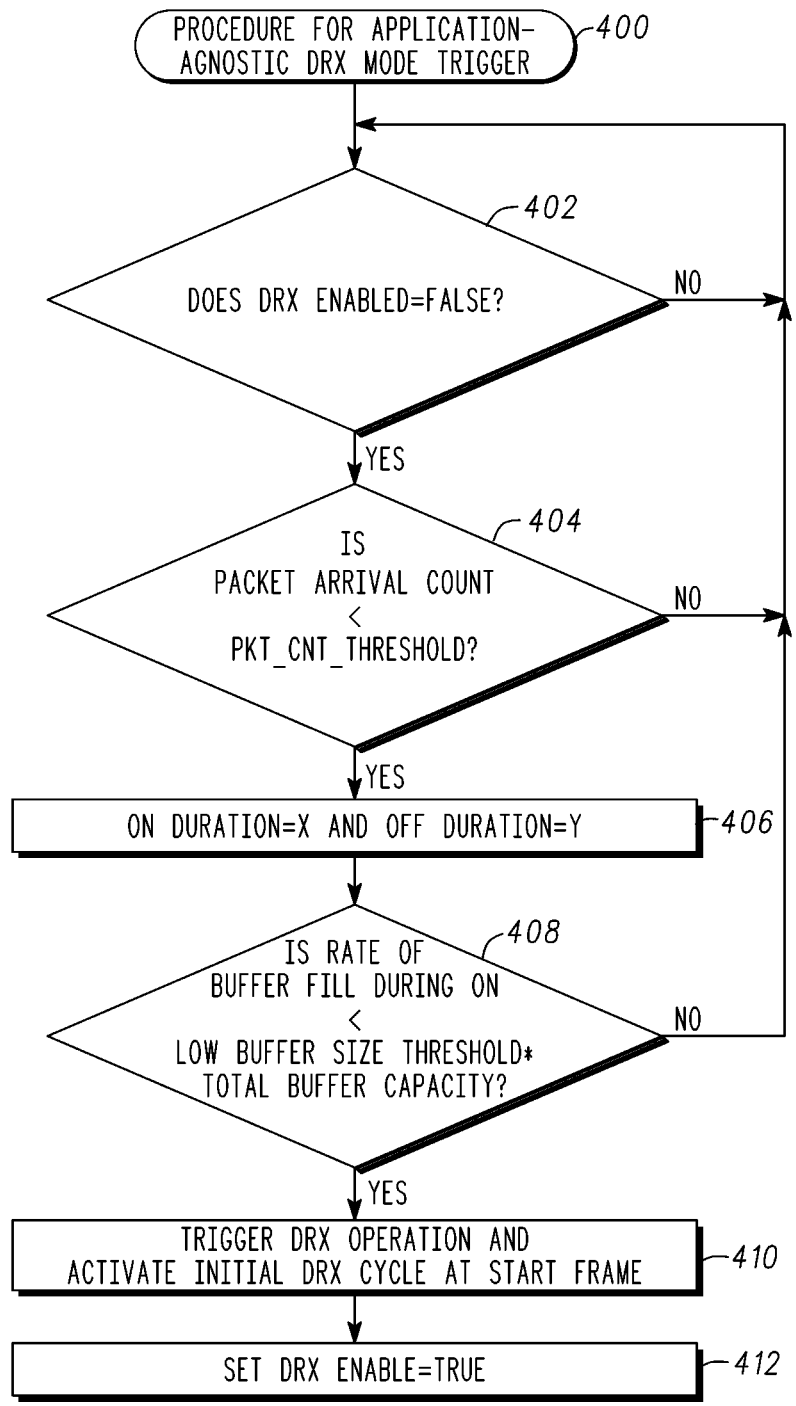
FIG. 4 is a procedure for application-agnostic DRX mode triggering in accordance with some embodiments.

FIG. 4 is a procedure for application agnostic DRX mode triggering in accordance with some embodiments. Procedure 400 may be performed by a UE, such as UE 102 (FIG. 1) or UE 300 (FIG. 3), although other devices may be configured to perform the operations of procedure 400.

In accordance with embodiments, the mobile client (i.e., the UE 102) monitors the state of traffic activity over a certain period of time by looking at several parameters. These parameters may include the number of packet arrivals from the downlink as well as packet departures on the uplink, and the rate at which the device memory is flushed for uplink traffic (e.g., the uplink buffer empty rate). This monitoring may be performed over a predetermined window of time to allow the UE 102 to generate a pattern and make a decision. In these embodiments, the UE 102 may check to see that if by activating DRX mode, whether the UE 102 is capable of handling a change in traffic activity. A sudden increase in traffic activity may overwhelm the UE's queues during the OFF duration, but by looking at the past history of traffic arrivals, the UE 102 may be able to better understand the probability of such an occurrence and prevent it.

In operation 402, the UE 102 may determine if DRX mode is currently activated. In some embodiments, the value for a DRX-enabled parameter may be set to 'false' when DRX mode is not enabled. When DRX mode is not currently activated, operation 404 may be performed.

In operation 404, the UE 102 may determine if the packet arrival count is less than a packet count threshold. When the packet arrival count is less than the packet count threshold, operation 406 may be performed. In these embodiments, the UE 102 may monitor a number of packet arrivals (i.e., received packets) and monitor a number of packet departures (i.e., packet transmissions) within a time window. To monitor the buffer status history, the UE 102 may be configured to monitor an uplink buffer empty rate at which an uplink buffer is flushed for uplink traffic over the time window.

In operation 406, an assignment is made for the DRX duty cycle when on-duration 204 (FIG. 2) may be represented as "x" and the off-duration may be represented as 'y'. The off-duration may correspond to the opportunity for DRX 205 (FIG. 2).

Operation 408 determines when the rate of buffer fill during the on-duration is less than a low-buffer size threshold multiplied by a total buffer capacity. As discussed above, in these embodiments, the threshold may be a fraction of the total buffer size of the UE 102, such as about twenty percent of the total buffer capacity. In these embodiments, the UE 102 may refrain from triggering DRX mode activation when there is a high probability that the buffer will be above the threshold (e.g., about twenty percent of the total buffer capacity, although the scope of the embodiments is not limited in this respect).

In operation 410, DRX mode activation is triggered. In some embodiments, the initial DRX cycle may be activated at the start of a frame.

In operation 412, the value for the DRX-enabled parameter may be set as 'true' to indicate that DRX mode is enabled.

In these embodiments, the UE 102 (FIG. 1) may analyze high-level traffic statistics to determine whether or not to trigger DRX mode activation. The UE 102 does not need to perform deep packet inspection or analyze the requirements of the applications that are running on the UE 102. Accordingly, embodiments disclosed herein for DRX mode activation are thus easy to implement and result in improved power savings without impact on application performance.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol.

Two types of reference signals may be transmitted by an eNB including demodulation reference signals (DM-RS), channel state information reference signals (CIS-RS) and/or a common reference signal (CRS). The DM-RS may be used by the UE 102 for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 300 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some LTE embodiments, the UE 102 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE 102 and reported to the eNB. In some embodiments, the UE 102 may transmit a physical uplink control channel (PUCCH) of format 2, 2a or 2b containing the CQI/PMI or RI.

In these embodiments, the CQI may be an indication of the downlink mobile radio channel quality as experienced by the UE 102. The CQI allows the UE 102 to propose to the eNB 104 (FIG. 1) an optimum modulation scheme and coding rate to use for a given radio link quality so that the resulting transport block error rate would not exceed a certain value, such as 10%. In some embodiments, the UE 102 may report a wideband CQI value which refers to the channel quality of the system bandwidth. The UE 102 may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to the UE 102 in which two or more cooperating/coordinating points, such as remote-radio heads (RRHs) transmit jointly. The RRHs may be controlled and configured by eNB 104. In these embodiments, the joint transmissions may be MIMO transmissions and the cooperating points are configured to perform joint beamforming.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) configured for application-agnostic Discontinuous Reception (DRX) mode triggering, the UE comprising:
    a memory arranged to store buffer status history and traffic activity history of the UE; and
    a processor in communication with the memory and configured to:
        monitor the buffer status history and traffic activity history, wherein:
            to monitor traffic activity history, the processor is configured to monitor a number of packet arrivals and a number of packet departures within a time window to provide an indication of data generation frequency of an active application on the UE, and
            to monitor the buffer status history, the processor is configured to monitor an uplink buffer empty rate at which an uplink buffer of the memory containing packets generated for transmission are flushed from the uplink buffer over the time window, the uplink buffer empty rate indicates a rate at which packets are being generated by the UE with respect to a network delay and takes into account a delay caused by the UE entering DRX mode;
        determine whether to trigger DRX mode activation based on at least one of the uplink buffer empty rate, the buffer status history or the traffic activity history; and
        trigger DRX mode activation, in response to a determination to trigger the DRX mode activation, based on the buffer status history and the traffic activity history and refrain from triggering the DRX mode activation, in response to a determination to refrain from triggering the DRX mode activation, when the uplink buffer empty rate indicates a rate at which packets being generated is greater than a rate at which packets are able to be transmitted in the DRX mode.

2. The UE of claim 1 wherein to monitor traffic activity history, the processor is configured to monitor the number of packet arrivals on a Physical Downlink Control Channel and monitor a number of packet departures on a Physical Uplink Control Channel.

3. The UE of claim 1 wherein the uplink buffer empty rate indicates a rate at which packets are being generated by the UE with respect to network delay,
    wherein the processor is configured to refrain from triggering DRX mode activation when the uplink buffer empty rate indicates a rate at which packets are being generated is greater than a rate at which packets can be transmitted in a DRX mode, and
    wherein the processor is configured to trigger DRX mode activation when the uplink buffer empty rate indicates a rate at which packets are being generated is no greater than the rate at which packets can be transmitted in the DRX mode and when the traffic activity history indicates a probability that a level of traffic activity that cannot be handled during the DRX mode will not occur.

4. The UE of claim 1 wherein the processor is further configured to:
    determine an on-duration of a DRX cycle based on the uplink buffer empty rate; and
    provide an indication of the on-duration to a serving eNB when triggering DRX mode activation.

5. The UE of claim 1 wherein the processor is further configured to:
    determine a probability, based on the buffer status history and the traffic activity history, that a level of traffic activity that cannot be handled during a DRX mode would occur;
    trigger the DRX mode activation when the probability is below a threshold based on a predetermined fraction of a total uplink buffer size; and
    refrain from triggering the DRX mode activation when the probability is at or above the threshold.

6. The UE of claim 1 wherein determination of whether to trigger the DRX mode activation is free from being based on a DRX inactivity timer.

7. The UE of claim 5 wherein during the DRX mode, the processor is configured to transmit and receive data during an on-duration time of a DRX cycle and refrain from transmitting and receiving data during a remainder of each DRX cycle.

8. The UE of claim 5 wherein the DRX mode includes at least an on-duration time and a DRX cycle length, the on-duration time being a period of time of the DRX cycle length during which the processor is configured to monitor orthogonal frequency division multiple access (OFDMA) frames of a physical downlink control channel (PDCCH), and
    wherein the DRX cycle length indicates a periodic repetition for a DRX cycle that includes the on-duration time followed by an opportunity for DRX time during which the UE is in a low-power state and does not transmit or receive data, the on-duration time dependent on based on a rate at which packets are being generated for uplink transmission.

9. The UE of claim 5 wherein to trigger DRX mode activation, the processor is configured to:
    send a DRX trigger request message to a serving eNB; and
    wait to receive a DRX mode confirmation message from the eNB before entering the DRX mode.

10. The UE of claim 1 wherein the processor is further configured to:
    use high-level traffic statistics comprising the buffer status history and traffic activity history to trigger DRX mode activation and refrain from triggering a DRX mode based on applications and based on deep packet inspection.

11. An application-agnostic Discontinuous Reception (DRX) triggering method comprising:
- monitoring buffer status history and traffic activity history at user equipment (UE), the traffic activity history providing an indication of data generation frequency of an activate application on the UE;
- determining a probability, based on the buffer status history and the traffic activity history, that a level of traffic activity that cannot be handled during DRX mode would occur;
- determining whether to trigger DRX mode activation based on at least one of an uplink buffer empty rate or the probability, the uplink buffer empty rate indicating a rate at which packets are being generated by the UE with respect to a network delay and takes into account a delay caused by the UE entering DRX mode;
- in response to a determination to trigger the DRX mode activation, triggering DRX mode activation when the probability is below a threshold; and
- in response to a determination to refrain from triggering the DRX mode activation, refrain from triggering the DRX mode activation when the uplink buffer empty rate indicates the rate at which packets being generated is greater than a rate at which packets are able to be transmitted in the DRX mode,
- wherein monitoring traffic activity history comprises monitoring a number of packet arrivals and monitor a number of packet departures within a time window, and
- wherein monitoring the buffer status history comprises monitoring an uplink buffer empty rate at which an uplink buffer of UE device memory containing packets generated for transmission are flushed from the uplink buffer over the time window.

12. The method of claim 11 wherein triggering DRX mode activation comprises sending a DRX trigger request message to a serving eNB, and
- wherein the method includes waiting to receive a DRX mode confirmation message from the eNB before entering DRX mode.

13. The method of claim 11 wherein monitoring traffic activity history comprises monitoring the number of packet arrivals on a Physical Downlink Control Channel and monitoring a number of packet departures on a Physical Uplink Control Channel.

14. A Discontinuous Reception (DRX) mode controller for use in User Equipment (UE), the DRX mode controller comprising:
- monitoring circuitry to monitor buffer status history and traffic activity history of the UE, the monitoring circuitry to monitor the traffic activity history by monitoring a number of packet arrivals and a number of packet departures within a time window) to provide an indication of data generation frequency of an active application on the UE, the monitoring circuitry to monitor the buffer status history and an uplink buffer empty rate by monitoring an uplink buffer of the memory containing packets generated for transmission are flushed from the uplink buffer over the time window, the uplink buffer empty rate indicates a rate at which packets are being generated by the UE with respect to a network delay and takes into account a delay caused by the UE entering DRX mode;
- determination circuitry to determine whether to trigger DRX mode activation based on at least one of the uplink buffer empty rate, the buffer status history or the traffic activity history; and
- triggering circuitry to, in response to a determination by the determination circuitry to trigger the DRX mode activation, generate a DRX mode trigger signal to trigger DRX mode activation based on the buffer status history and the traffic activity history and to, in response to a determination by the determination circuitry to refrain from triggering the DRX mode activation, refrain from triggering the DRX mode activation when the uplink buffer empty rate indicates a rate at which packets being generated is greater than a rate at which packets are able to be transmitted in the DRX mode.

15. The DRX mode controller of claim 14 wherein the monitoring circuitry is to interface with one or more layers of the UE to monitor the buffer status history and the traffic activity history.

16. The DRX mode controller of claim 15 wherein to trigger DRX mode activation, the triggering circuitry is configured to send a DRX trigger request message to a serving eNB, and
- wherein the UE is configured to wait to receive a DRX mode confirmation message from the eNB before entering DRX mode.

17. The DRX mode controller of claim 16 wherein to monitor traffic activity history, the monitoring circuitry is configured to monitor a number of packet arrivals and monitor a number of packet departures within a time window, and
- wherein to monitor the buffer status history, the monitoring circuitry is configured to monitor an the uplink buffer empty rate over the time window.

18. The UE of claim 1 wherein the processor is further configured to:
- determine the network delay based on the uplink buffer empty rate.

19. The UE of claim 1 wherein:
the time window is unrelated to the DRX cycle.

20. The UE of claim 1 wherein:
a determination to trigger DRX mode activation is based on traffic activity history that indicates non-zero data generation over the time window.

* * * * *

UNITED STATES PATENT AND TRADEMARK OFFICE
CERTIFICATE OF CORRECTION

PATENT NO.         : 9,949,243 B2
APPLICATION NO.    : 13/993023
DATED              : April 17, 2018
INVENTOR(S)        : Gupta et al.

Page 1 of 1

It is certified that error appears in the above-identified patent and that said Letters Patent is hereby corrected as shown below:

In the Claims

In Column 9, Line 25, in Claim 1, before "User", insert --A--

In Column 11, Line 6, in Claim 11, delete "activate" and insert --active-- therefor In Column 11, Line 52, in Claim 14, delete "window)" and insert --window-- therefor In Column 12, Line 42, in Claim 17, after "monitor", delete "an"

Signed and Sealed this
Fourth Day of June, 2019

Andrei Iancu
*Director of the United States Patent and Trademark Office*